United States Patent
Higashiura

(10) Patent No.: US 8,134,730 B2
(45) Date of Patent: Mar. 13, 2012

(54) OUTPUT CONTROL SYSTEM

(75) Inventor: Masaki Higashiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 901 days.

(21) Appl. No.: 12/178,726

(22) Filed: Jul. 24, 2008

(65) Prior Publication Data

US 2009/0033960 A1    Feb. 5, 2009

(30) Foreign Application Priority Data

Aug. 3, 2007  (JP) .................. 2007-202443

(51) Int. Cl.
  *G06F 15/00* (2006.01)
  *H04W 24/00* (2009.01)
(52) U.S. Cl. .................... 358/1.15; 455/456.1
(58) Field of Classification Search ............ 358/1.15, 358/1.16, 1.14, 1.18, 1.9, 474, 408, 3.24, 358/468, 442; 709/203, 223, 224, 219, 207; 370/356, 252, 400, 390; 455/556.1, 420; 715/747

See application file for complete search history.

(56) References Cited

U.S. PATENT DOCUMENTS 6,295,133 B1 * 9/2001 Bloomquist et al. .......... 358/1.1

FOREIGN PATENT DOCUMENTS

| JP | 2001-277662 | 10/2001 |
|---|---|---|
| JP | 2003-127470 | 5/2003 |
| JP | 2003-345583 | 12/2003 |
| JP | 2004-110337 | 4/2004 |
| JP | 2004-348184 | 12/2004 |
| JP | 2005-193408 | 7/2005 |
| JP | 2006-069093 | 3/2006 |

* cited by examiner

*Primary Examiner* — Saeid Ebrahimi Dehkordy
(74) *Attorney, Agent, or Firm* — Edwards Wildman Palmer LLP; David G. Conlin; Stephen D. LeBarron

(57) ABSTRACT

The present invention is to provide an output control system in which an information processing apparatus instructs an image output apparatus to output image data, and in which the image output apparatus outputs the image data. The output control system is configured by an image output apparatus 1 and a plurality of information processing apparatuses 7. The information processing apparatus 7 includes an output data creation section 14 which generates output data from image data to be processed. When an image data file to be processed is opened, a control section 13 instructs the output data creation section 14 to generate output data of the first page of the image data to be processed without depending on an output instruction from a user, and transmits the output data to the image output apparatus 1. The image output apparatus 1 temporarily holds the received output data. When the output instruction is inputted from the user, the image output apparatus 1 outputs the temporarily held output data.

8 Claims, 10 Drawing Sheets

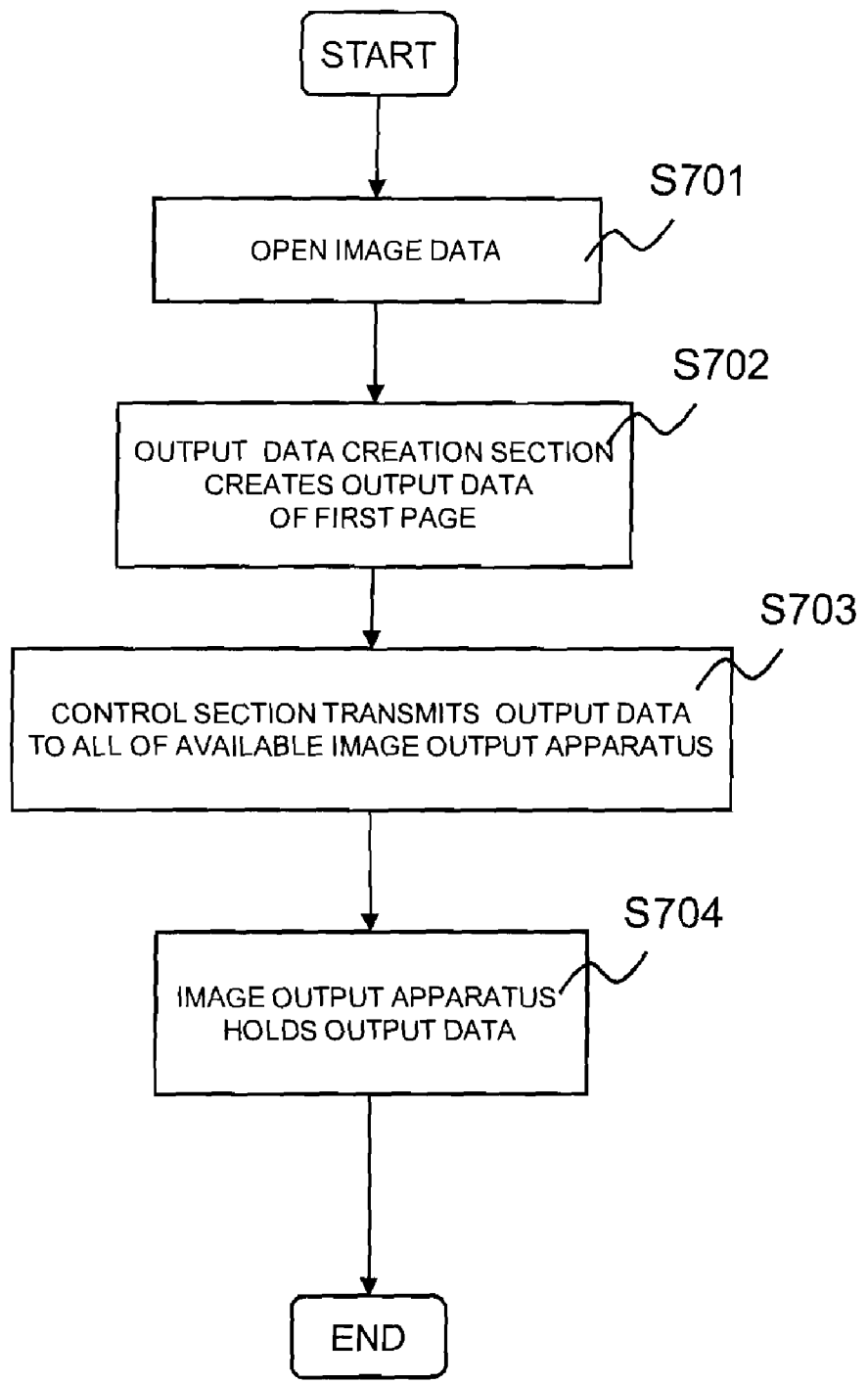

OUTPUT CONTROL SYSTEM

BACKGROUND OF THE INVENTION

1. Field of the Invention

The present invention relates to an output control system in which an information processing apparatus instructs an image output apparatus to output image data, and in which the image output apparatus outputs the image data.

2. Description of the Related Art

When image data created by an information processing apparatus, such as a personal computer, are outputted from an image output apparatus in an output control system in recent years, the information processing apparatus, such as a personal computer first creates output data, which can be outputted by the information processing apparatus, from image data consisting of a plurality of pages, and transmits the output data to the image output apparatus. The image output apparatus temporarily holds all the pages of the inputted output data in a memory. Then, the image output apparatus reads the output data held in the memory, and converts the read data into print data, or the like, so as to output the converted data.

For example, in Japanese Patent Laid-Open No. 2004-348184, there is described an output control system in which when output data generated from image data are transmitted from an information processing apparatus to an image output apparatus, authentication of a user is performed, and in which when the user is authenticated, the output data are transmitted from the information processing apparatus to the image output apparatus.

In such an output control system, however, the information processing apparatus transmits output data generated from the image data after output instruction is made by a user, and the image output apparatus converts the inputted output data into print data, or the like, so as to output the converted data. That is, the image processing apparatus initiates preparation for outputting image data in the course of processing after output instruction is made by a user. As a result, there is such a problem that it would take some time for the image output apparatus to output the image data after output instruction is made by a user. In view of this, the object of the present invention is to provide an output control system capable of reducing the time between the output instruction of the image data and the completion of output by the image output apparatus.

SUMMARY OF THE INVENTION

In order to achieve the above described object, the present invention is featured by including an information processing apparatus for processing image data, and an image output apparatus for outputting the processed image data, and is featured in that the information processing apparatus transmits a part of the image data to the image output apparatus at the time when processing the image data, and in that the image output apparatus holds the inputted image data in an outputtable state.

When the image data are processed by the information processing apparatus, a part of the image data is transmitted beforehand to the image output apparatus, and the transmitted image data are temporarily held by the image output apparatus. Then, when an instruction to output the image data is issued from the information processing apparatus, the temporarily held image data are immediately outputted by the image output apparatus on the basis of the output instruction.

While a part of the image data is being outputted, the remaining data is transmitted to the image output apparatus, stored in such as a memory of the image output apparatus, and subsequently outputted. Thereby, there is no so-called initial movement for performing transmission from the image processing apparatus to the image output apparatus, thus leading to curtailing the operating time for outputting image data. Consequently, the first action required for outputting image data quickens, and the processing efficiency in the whole system can be enhanced.

When the image data processed by the information processing apparatus consist of a plurality of pages, the information processing apparatus transmits the first page or the currently processed page of the image data to the image output apparatus. The information processing apparatus transmits beforehand to the image output apparatus a page which is to be surely outputted. This enables the image output apparatus to immediately start the output at the time when the output instruction is inputted by the user.

The information processing apparatus is featured in that the information processing apparatus transmits the image data to the image output apparatus each time updating the image data. Thus, when the output instruction is issued, the latest image data can be immediately outputted.

When the processing of the image data is finished by the information processing apparatus without the output instruction of the image data being issued, for example, when the processing of the image data is finished without the input of output instruction by the user, or when a deletion instruction is inputted by the user to delete the image data outputted beforehand to the image output apparatus, the information processing apparatus instructs the image output apparatus to delete the image data held in the image output apparatus.

With the above described configuration, the image output apparatus is allowed to delete the unnecessary image data, so that the storage capacity of the hard disk, and the like, of the image output apparatus can be prevented from being pressed. Further, it is possible to prevent leakage of confidential documents.

Image data are inputted into the image output apparatus from a plurality of information processing apparatuses. Alternatively, a plurality of image data are inputted from one information processing apparatus. Thereby, the information processing apparatus becomes in a state of holding the plurality of image data.

Thus, the information processing apparatus adds ID information for identification of image data to the image data to be transmitted. Specifically, the information processing apparatus creates the ID information including one or more of user information, information processing apparatus information, image data information, a date and time, and a page number. Then, the information processing apparatus adds the ID information to the image data to be outputted to the image output apparatus. With such configuration, each of the image data held in the information processing apparatus can be discriminated.

The present invention is featured in that a plurality of the image output apparatuses are provided, and in that the information processing apparatus transmits the same image data to one or more of the image output apparatuses.

While processing the image data, the information processing apparatus is unable to recognize from which one of the image output apparatuses the user wishes to output the image data. Therefore, the information processing apparatus transmits the image data to at least one or more of the image output apparatuses connected to the information processing apparatus. Thereby, even when the user selects any of the image output apparatuses, the output of the image data can be immediately started.

As described above, according to the present invention, when the user starts the processing of image data in the information processing apparatus, the information processing apparatus transmits a part of the image data to the image output apparatus. The image output apparatus holds the inputted image data. When the user inputs an output instruction of the image data, the image output apparatus outputs the image data held therein immediately.

This makes it possible to eliminate the so-called operation time until the image data are outputted from the image processing apparatus to the image outputting apparatus, and makes it possible to quicken the first action for the output. As a result, the processing efficiency of the entire system can be improved.

BRIEF DESCRIPTION OF THE DRAWINGS

FIG. 10 is a flow chart showing an operation in the case where the information processing apparatus outputs output data to a plurality of image output apparatuses.

DETAILED DESCRIPTION OF THE PREFERRED EMBODIMENTS

First Embodiment

In the following, an output control system according to a first embodiment will be described in detail.

Figure 1:
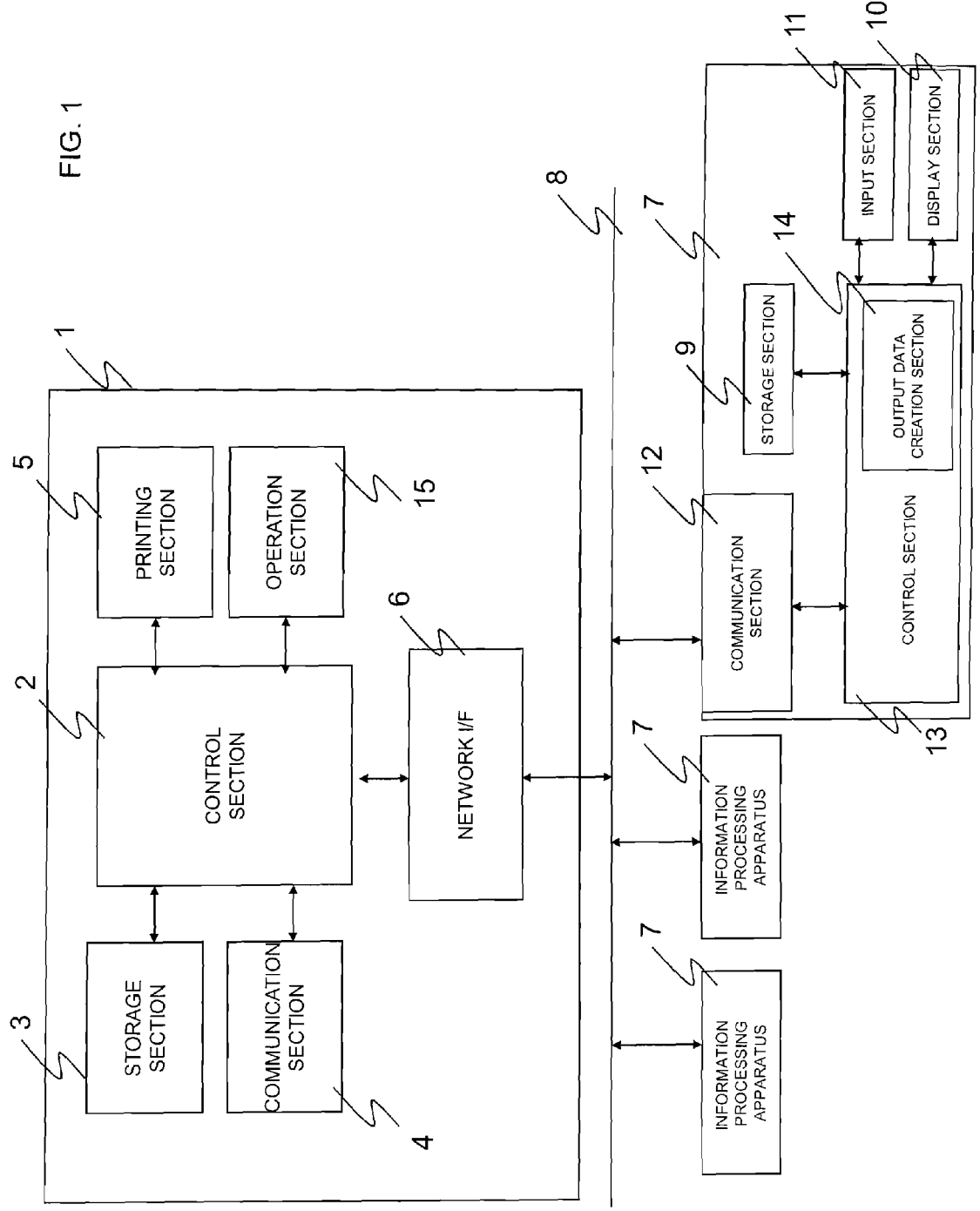
FIG. 1 is a block diagram showing an example of an output control system according to a first embodiment.

FIG. 1 shows an example of an output control system according to the present embodiment. The output control system according to the first embodiment is configured by an image output apparatus 1 and a plurality of information processing apparatuses 7.

The image output apparatus 1 is an apparatus which executes processing on the basis of an input from the information processing apparatus 7. The information processing apparatus 7 is a personal computer which issues an output instruction to the image output apparatus 1 on the basis of an output instruction from a user.

The image output apparatus 1 and the plurality of information processing apparatuses 7 are respectively connected to a network 8, such as a LAN, a WAN, and the Internet. Thereby, an input and output of the data between the respective apparatuses are performed via the network 8.

The image output apparatus 1 is a multifunctional peripheral that performs processing such as copying, printing, scanning, facsimile communication, and document filing, and that outputs image data by printing, facsimile and data transmission operations. The image output apparatus 1 includes a storage section 3 which stores inputted image data, a communication section 4 which performs communication with the information processing apparatus, a printing section 5 which prints the image data on a recording sheet, a network I/F 6 which controls communication through the network 8, an operation section 15 which receives an input from the user, and a control section 2 which controls the apparatus as a whole. Note that the communication section 4 performs facsimile communication through a public telephone line.

The printing section 5 prints image data subjected to image processing, such as compression, extension and working, on a recording sheet supplied from a paper feed section on the basis of an output instruction from the user, and discharges the printed recording sheet to a paper discharge section.

The operation section 15 is an operation panel configured by an input section consisting of various input keys and a display section such as a liquid crystal display. The input section has fixed keys with which various input operations are performed. The display section has a touch panel which receives an operation input performed by touching a panel surface with a finger, a dedicated pen, and the like.

The communication section 4 is connected to a telephone line network via the telephone line, and performs facsimile communication with an external facsimile apparatus. The network I/F 6 is connected to a router, a switching hub, and the like, via a LAN cable, and is connected to a network configured by the respective information processing apparatuses 7, a server, and the like. The communication section 4 and the network I/F 6 receive image data from external apparatuses, such as the information processing apparatus 7 and the facsimile apparatus, so as to input the received image data. Further, the network I/F 6 also receives an input of output instruction at the same time when receiving the image data from the information processing apparatus 7. Further, the communication section 4 and the network I/F 6 execute processing to output image data to the external apparatus.

The storage section 3 consists of an HDD (Hard Disk Drive). The storage section 3 stores various control programs and various data. The storage section 3 temporarily holds output data inputted from the information processing apparatus 7, as will be described below. That is, the storage section 3 stores the inputted output data in the state where the output data can be outputted immediately after the output instruction is received from the information processing apparatus 7. The storage section 3 reads the temporarily held output data on the basis of the output instruction from the information processing apparatus 7, and outputs the read output data to the printing section 5. At this time, in order to prevent the outputted output data from being left in the storage section 3, the storage section 3 deletes the output data.

The control section 2 is configured by a microcomputer having a CPU, a ROM and a RAM. The ROM stores various control programs for controlling the respective apparatuses, various data, and the like. The RAM functions as a memory and a work area at the time when the CPU executes the various control programs. The RAM also functions as a memory for temporarily storing data. The CPU reads the control program stored in the ROM and the storage section 3 to the RAM, and executes the control program to operate the respective sections.

With the above described configuration, the control section 2 controls the respective sections according to the input from the operation section 15 and the information processing apparatus 7, so as to execute processing of the inputted image data. By the execution of the processing, one of a copy mode, a print mode, a scan mode, and a facsimile mode is executed, so that the image data are outputted in a desired form.

The control section 2 controls the operation of the respective sections on the basis of the output instruction inputted from the operation section 15 and the information processing apparatus 7, and makes the display section display an operation screen in correspondence with the operation state. The display section displays a touch key, a message, and the like, on the basis of the instruction from the control section 2.

Each of the information processing apparatuses 7 is a personal computer which executes processing such as creation, working and modification of image data, and executes the processing of image data according to an input from the user. The information processing apparatuses 7 includes a storage section 9 which stores various control programs and various data, a display section 10 which displays information, an input section 11 which inputs a processing condition for the image output apparatus 1, a communication section 12 which communicates with the image output apparatus 1 via the network, and a control section 13 which controls the entire apparatus. Note that the storage section 9, the display section 10, the input section 11, the communication section 12, and the control section 13 are connected to each other via a bus.

The storage section 9 is an HDD which stores various control programs including a program for controlling the image output apparatus 1, an OS (Operating System), various data, and the like.

The display section 10 is, for example, a CRT display or a liquid crystal display, and displays image data, a result, and the like.

The input section 11 is a user interface which includes, for example, a keyboard and a pointing device. The user instructs the processing of image data, the output of image data, and the like, by operating the input section 11.

The communication section 12 is connected to the telephone line network via a telephone line, and performs facsimile communication with an external facsimile apparatus. The communication section 12 is connected to a router, a switching hub, and the like, via an LAN cable, and includes a network I/F connected to the network which is configured by the image output apparatus 1, the server, and the like. The communication section 12 receives image data from the other external apparatuses such as the information processing apparatus 7 and the facsimile apparatus. Further, the communication section 12 executes processing to transmit the image data to the external apparatus.

The control section 13 is configured by a microcomputer having a CPU, a ROM and a RAM. The CPU reads a control program stored in the ROM and the storage section 9 to the RAM, and executes the control program, so as to operate the respective sections. Note that the RAM also functions as a memory for temporarily storing data.

The control section 13 includes an output data creation section 14 which converts data to be processed into output data, such as PDL (Page Description Language) data corresponding to the image output apparatus 1, display list format data, or image format data printable by a print engine.

The control section 13 instructs the output data creation section 14, on the basis of the output instruction from the user, to generate output data from the image data to be processed, and outputs the generated output data to the image output apparatus 1 via the communication section 12. Specifically, the control section 13 drives the output data creation section 14. The output data creation section 14 prompts the user to input a setting related to the print format of the image output apparatus 1, on the basis of the control program serving as a printer driver. When the user completes the input of the setting related to the print format, the output data creation section 14 generates the output data corresponding to the image output apparatus 1 from the image data on the basis of the inputted setting, that is, the output instruction. Then, the control section 13 outputs the output data to the image output apparatus 1 via the communication section 12.

The control section 13 has a function that instructs the output data creation section 14 to generate output data from a part of the image data to be processed, without depending on the output instruction from the user, and that transmits the generated output data to the image output apparatus 1 via the communication section 12. That is, while executing the processing to display the image data in the display section 10, the control section 13 makes the output data creation section 14 create the output data of a part of the image data, and transmits the created output data to the image output apparatus 1 via the communication section 12. Note that the processing is executed so as not to be recognized by the user.

Specifically, the user makes one of registered application programs executed, so that the processing of image data is executed by the application program. Then, the control section 13 instructs the output data creation section 14 to generate output data of the first page of image data to be processed, output data of the page being processed, or output data of a plurality of pages configuring the image data. When the output data are generated, the control section 13 transmits the generated output data to the image output apparatus 1 via the communication section 12. The output data are temporarily held in the storage section 3 of the image output apparatus 1.

After transmitting the output data to the image output apparatus 1, the control section 13 checks whether or not the image data, from which the output data are generated, are updated. For example, the control section 13 checks whether or not an input for storing the image data is performed by the user, or whether or not an input for processing of the image data is performed by the user.

When detecting the input from the user for the image data to be processed, the control section 13 recognizes that the image data are updated. Then, the control section 13 again instructs the output data creation section 14 to generate output data of the image data being processed, and transmits the generated output data to the image output apparatus 1 via the communication section 12. Note that the timing at which the output data are generated from the updated image data is not restricted to the time when the presence of the input from the user is detected, but the timing may also be set, for example, at each predetermined time.

When the user ends the processing of the image data to be processed without instructing the output of the image data, the control section 13 instructs the image output apparatus 1 to delete the output data previously transmitted and held in the storage section 3. Specifically, when the user ends the processing of the image data to be processed and closes the image data file, or when the user ends the application program which is made to be executed by the user, the control section 13 checks whether or not the output instruction is inputted by the user. When the control section 13 is unable to confirm the output instruction, the output data creation section 14 instructs the image output apparatus 1 to delete the previously outputted output data. When detecting the input of the deletion instruction, the control section 2 of the image output apparatus 1 deletes the output data stored in the storage section 3. Note that also when a cancel instruction, that is, a deletion instruction is inputted by the user, the control section 2 similarly deletes the output data stored in the storage section 3.

Next, the operation of the output control system will be described with reference to FIG. 2 to FIG. 4. Note that it is assumed, for convenience of explanation, that the first page of the image data to be processed is transmitted in advance by the output data creation section 14 to the image output apparatus 1, and that the output mode of the image output apparatus 1 is a print mode.

Figure 2:
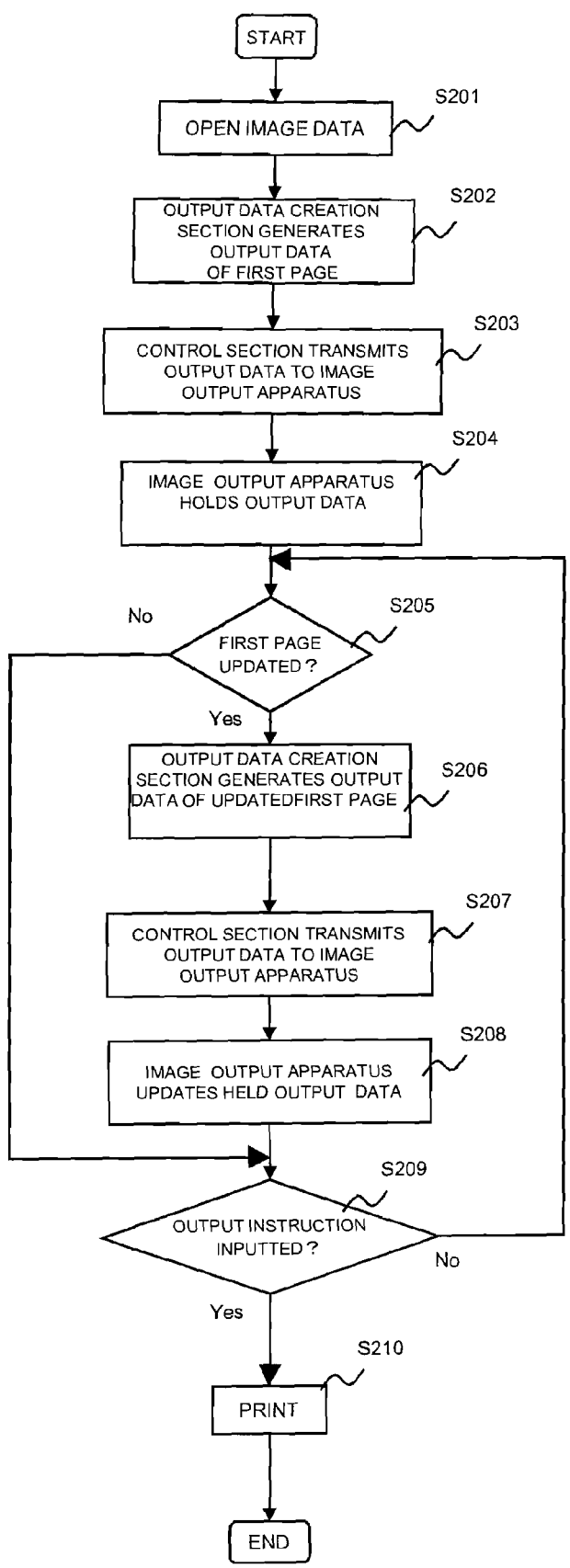
FIG. 2 is a flow chart showing a preceding output operation performed by an output data creation section.

As shown in FIG. 2, the user opens an image data file to be processed in the information processing apparatus 7 (S201). When the image data file is opened, the control section 13 instructs the output data creation section 14 to generate output data of the first page of the image data in the opened file (S202).

When the output data are generated, the control section 13 transmits the generated output data to the image output apparatus 1 via the communication section 12 (S203). The image output apparatus 1 temporarily holds the received output data in the storage section 3 (S204).

After transmitting the output data to the image output apparatus 1, the control section 13 checks whether or not the first page of the image data, from which the output data are created, is updated (S205). When the first page of the image data is updated, the control section 13 instructs the output data creation section 14 to create the output data of the updated first page of the image data (S206). When the output data are created, the control section 13 transmits the created output data to the image output apparatus 1 (S207).

When receiving the output data from the information processing apparatus 7, the image output apparatus 1 overwrites the received output data on the output data previously held in the storage section 3, so as to hold the overwritten output data (S208). Then, the control section 13 checks whether or not an output instruction of the processed image data is inputted (S209). When the output instruction is not inputted, the control section 13 again checks whether or not the image data are updated (S205). When the image data are updated, the control section 13 makes the output data of the updated image data created, and transmits the created output data to the image output apparatus 1 (S210).

Figure 3:
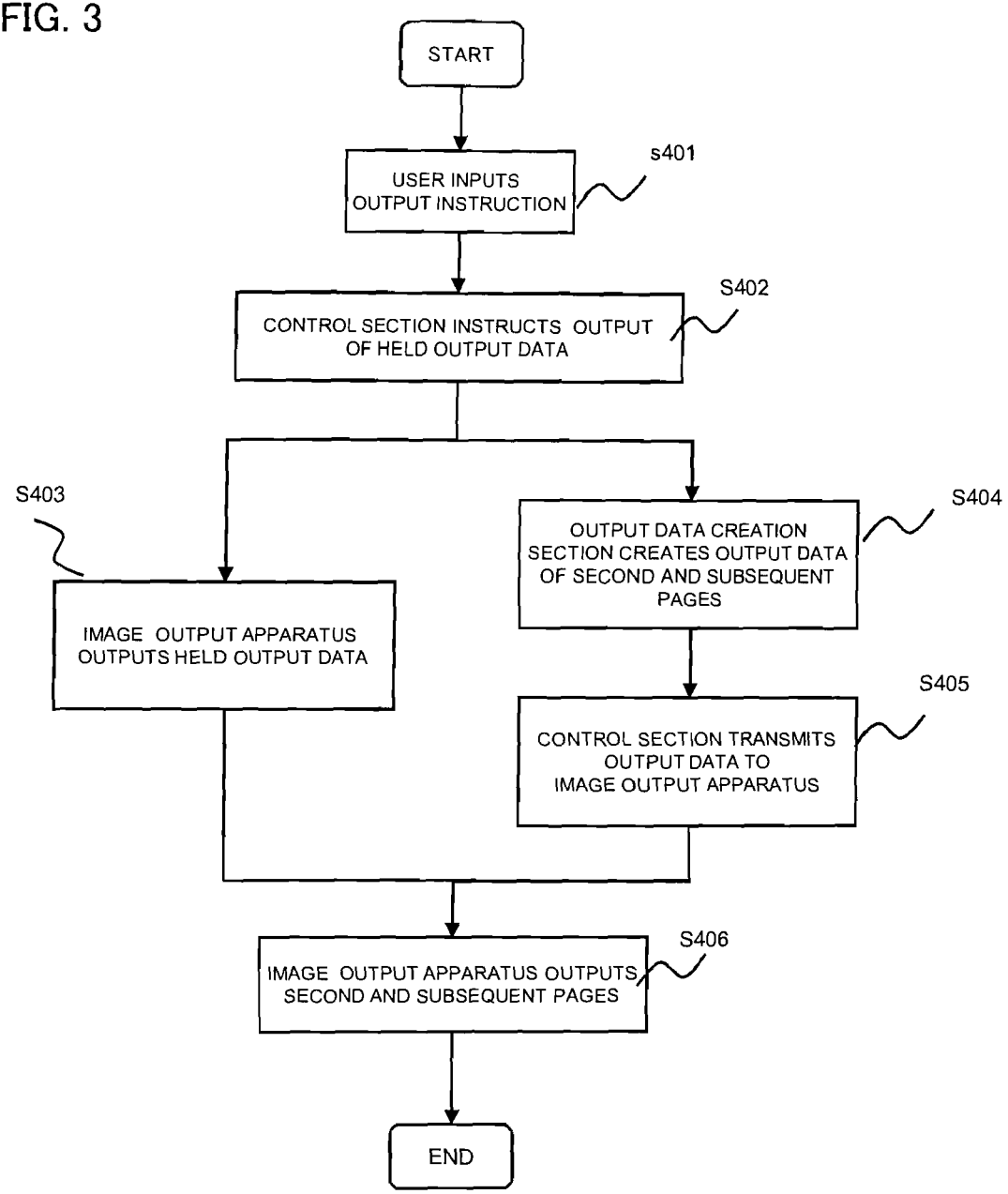
FIG. 3 is a flow chart showing an operation of the output data creation section at the time when an output instruction is inputted by a user.

When, after the processing of the image data is completed, the image data are outputted, the user inputs, as shown in FIG. 3, an instruction for outputting the processed image data from the input section 11 (S401). When detecting the input of the output instruction, the control section 13 instructs the image output apparatus 1 to output the output data held in the storage section (S402). The image output apparatus 1 outputs, on the basis of the instruction from the information processing apparatus 7, the output data held in the storage section 3 to the printing section 5 (S403), so as to enable the output data to be printed on a recording paper, and the like.

While the output data held in the image output apparatus 1 are outputted, the control section 13 instructs the output data creation section 14 to create output data of pages other than the previously transmitted first page of the image data, that is, output data of the second and subsequent pages (S404). The control section 13 outputs the created output data to the image output apparatus 1 (S405).

Upon completion of output of the output data held in the storage section 3, the image output apparatus 1 outputs the output data received from the information processing apparatus 7 (S406). Then, the image output apparatus 1 deletes the output data held in the storage section 3.

Figure 4:
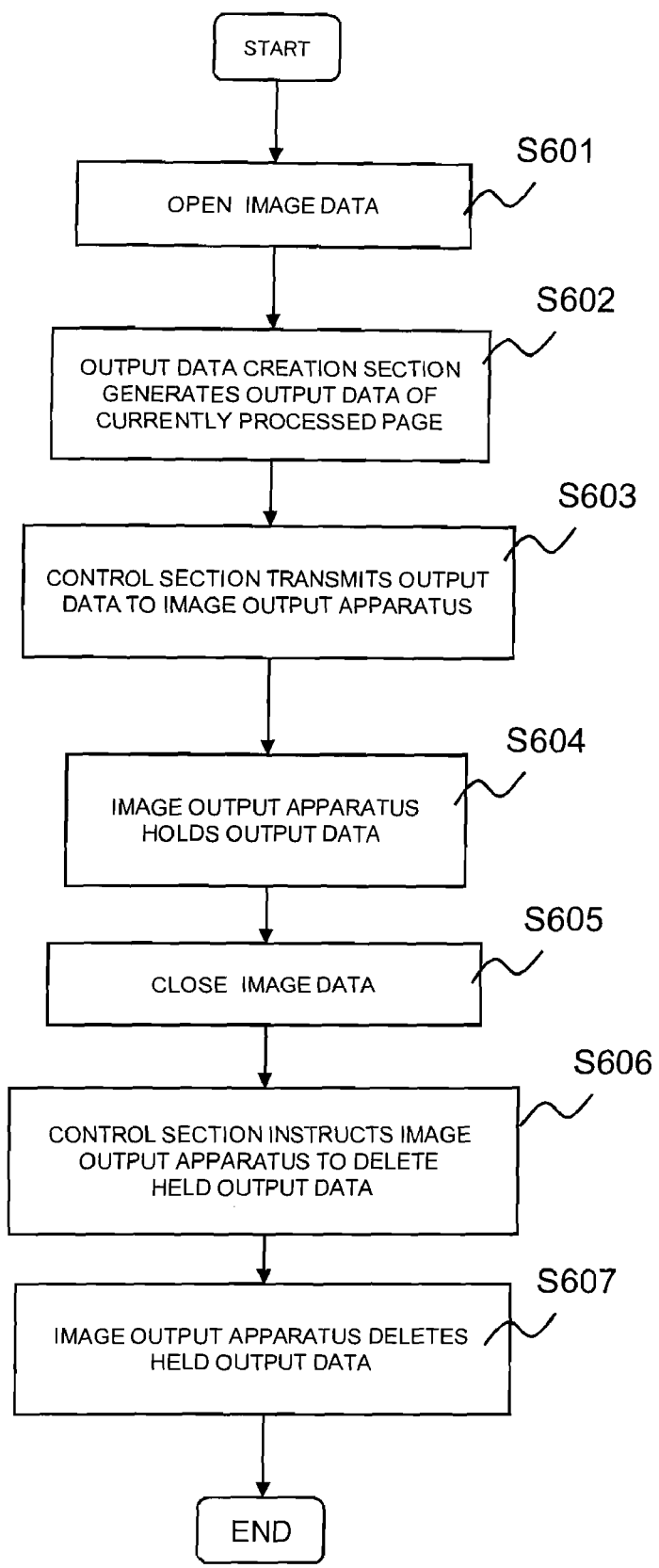
FIG. 4 is a flow chart showing an operation of the output data creation section at the time when processing is finished without the output instruction being inputted by the user.

When the processing of the image data is completed without the output instruction of the image data being inputted by the user (S605), the control section 13 instructs the image output apparatus 1 to delete the currently held output data, as shown in FIG. 4 (S606). The control section 2 of the image output apparatus 1 deletes the stored output data (S607).

Thereby, the output control system is able to output the first page of the image data immediately when the output instruction is inputted by the user. That is, the time period necessary for the output data creation section 14 to create the output data is eliminated, and thereby the time period from the output instruction to the output of the image data can be reduced. Further, when the image data are not outputted, the previously outputted output data are surely deleted. Thus, it is possible to surely prevent leakage of information.

Second Embodiment

Figure 6:
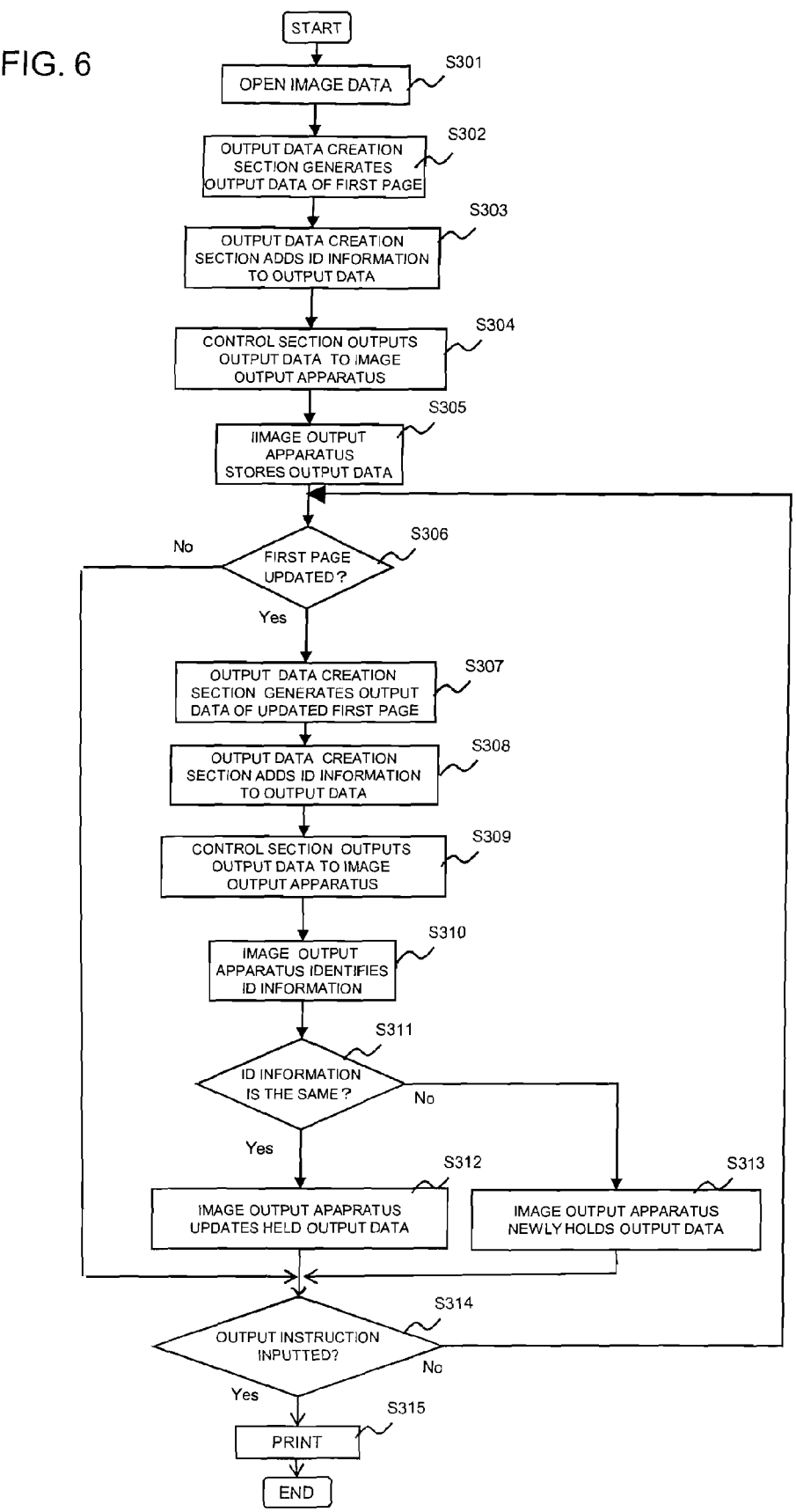
FIG. 6 is a flow chart showing an operation in the case where the first page of image data to be processed by the output data creation section is outputted in advance.
Figure 7:
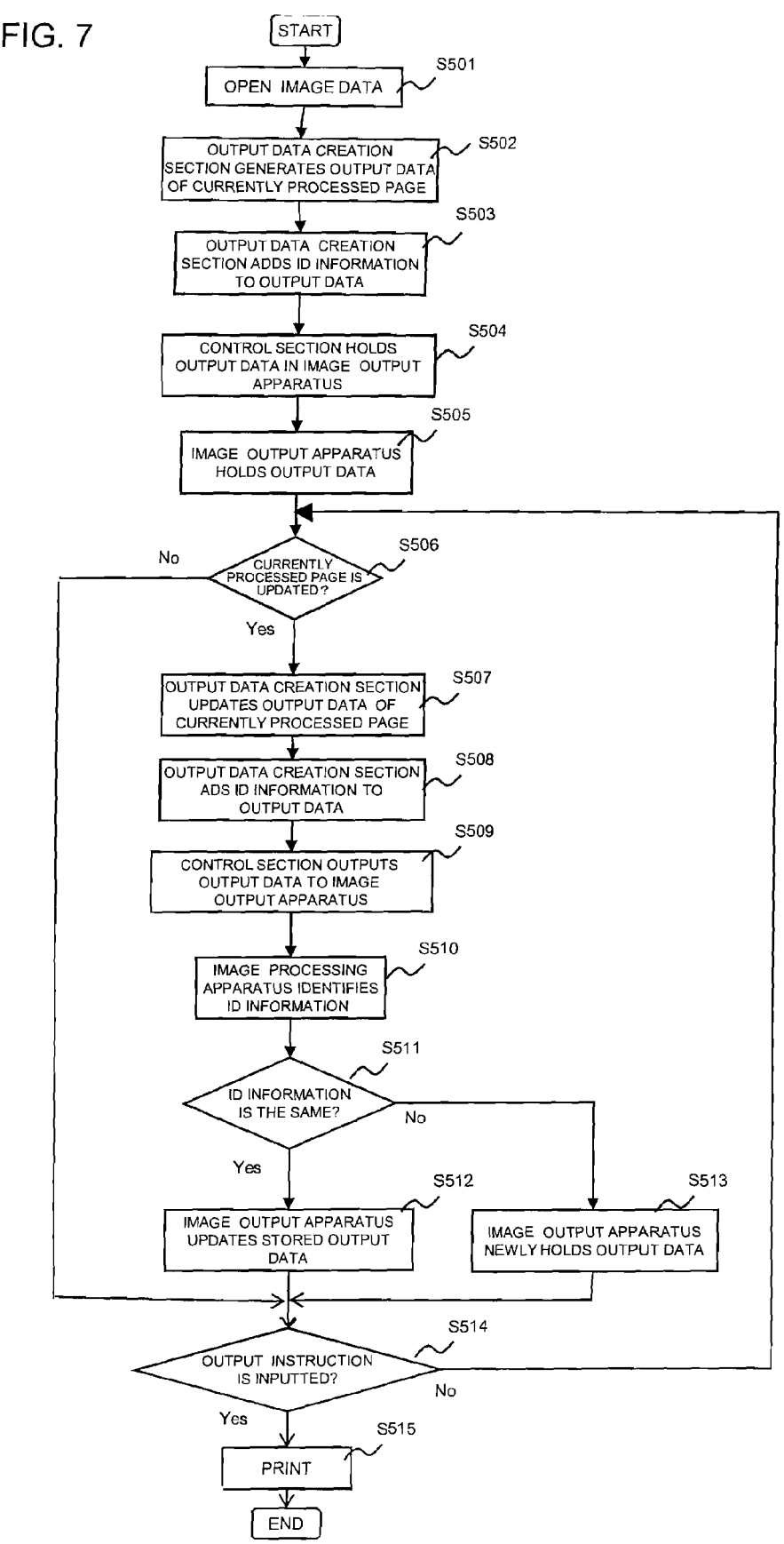
FIG. 7 is a flow chart showing an operation in the case where a page of the image data being processed by the output data creation section is outputted in advance.

Next, an output control system according to a second embodiment will be described with reference to FIG. 5 to FIG. 7. Note that the present embodiment is different from the first embodiment in that when output data 50 are created, the output data creation section 14 creates ID information 51 of the image data. The other configuration and operation effects are the same as those of the first embodiment.

When outputting or previously outputting image data to the image output apparatus 1, the output data creation section 14 creates the ID information 51 for identifying the image data. The ID information 51 includes various information related to the image data, such as user information, information processing apparatus information, image ID information, a date and time, and a page number.

Figure 5:
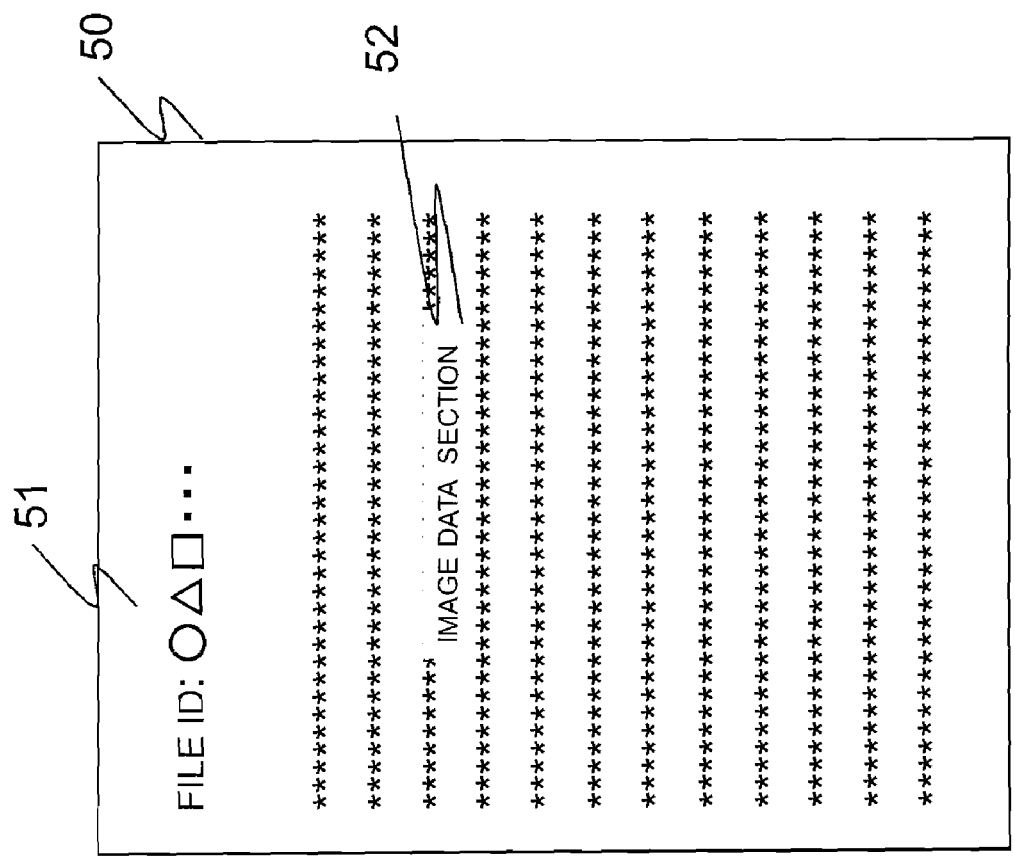
FIG. 5 is a figure showing output data according to a second embodiment.

The created ID information 51 is added to the header information of the output data 50, as shown in FIG. 5. Thereby, on the basis of the added ID information 51, the control section 2 of the image output apparatus 1 is able to identify the inputted output data 50, and is also able to discriminate the output data inputted from the other information processing apparatus 7. Note that the ID information 51 is created so as not to overlap with the ID information created by the other information processing apparatus. Note that reference numeral 52 in FIG. 5 denotes an image data section of output data formed of an image and text.

Next, the operation of the output control system will be described with reference to FIG. 6. Note that it is assumed, for convenience of explanation, that the first page of the image data to be processed is transmitted in advance by the output data creation section 14 to the image output apparatus 1, and that the output mode of the image output apparatus 1 is a print mode. Further, it is assumed that the ID information 51 to be added is a serial number added to respective image data.

The user opens an image data file to be processed in the information processing apparatus 7 (S301). When the image data file is opened, the control section 13 instructs the output data creation section 14 to generate the output data 50 of the first page of the image data in the opened file (S302).

When the output data 50 are generated, the output data creation section 14 creates the ID information 51 of the image data from which the output data 50 are created, and adds the ID information 51 to the output data 50 (S303). The control section 13 transmits the output data 50, to which the ID information 51 is added, to the image output apparatus 1 (S304). The image output apparatus 1 holds the received output data in the storage section 3 (S305).

After transmitting the output data 50 to the image output apparatus 1, the control section 13 checks whether or not the first page of the image data, from which the output data 50 are created, is updated (S306). When the first page of the image data is updated, the control section 13 instructs the output data creation section 14 to create the output data 50 of the updated first page of the image data (S307). The output data creation section 14 creates the ID information 51 of the image data from which the output data are created, and adds the ID information 51 to the output data 50 (S308). The control section 13 transmits the output data 50, to which the ID information 51 is added, to the image output apparatus 1 (S309).

When the output data 50 are inputted from the information processing apparatus 7, the control section 2 of the image output apparatus 1 extracts the ID information 51 added to the output data 50, and identifies the ID information 51 (S310). The control section 2 checks whether or not the output data 50, to which the same ID information 51 as the identified ID information 51 is added, are held in the storage section 3 (S311).

When the output data 50, to which the same ID information 51 is added, are held, the control section 2 overwrites the inputted output data 50 on the previously stored output data (S312). When the output data 50, to which the same ID information 51 is added, are not stored, the control section 2 newly holds the inputted output data 50 in the storage section 3 (S313).

The control section 13 checks whether or not the output instruction of the processed image data is inputted (S314). When the output instruction is not inputted, the control section 13 again checks whether or not the image data are updated (S306). When the image data are updated, the control section 13 makes the output data 50 of the updated image data created, and transmits the created output data 50 to the image output apparatus 1 (S315).

When, after the processing of the image data is completed, the image data are outputted, the processing is performed similarly to the first embodiment, as shown in FIG. 3. Further, also when the processing of the image data is completed without the output instruction being inputted by the user, the processing is performed similarly to the first embodiment.

Note that when the information processing apparatus 7 opens a plurality of image data files, the control section 13 makes the output data creation section 14 create the output data of the respective image data. At this time, the ID information 51 is added to the respective output data 50. When the ID information 51 is added to the respective output data 50, the control section 13 transmits the respective output data 50 to the image output apparatus 1.

Meanwhile, the output data creation section 14 may transmit in advance to the image output apparatus 1 the page currently being processed, instead of the first page of the image data to be processed. In this case, as shown in FIG. 7, the user opens the image data file to be processed in the information processing apparatus 7 (S501). When the image data file is opened, the user moves a cursor to the page to be processed and inputs the data. When the data are inputted by the user, the control section 13 confirms the currently opened page and instructs the output data creation section 14 to generate the output data 50 of the confirmed page of the image data (S502).

When the output data 50 are generated, the output data creation section 14 creates the ID information 51 of the image data, from which the output data 50 are created, and adds the ID information 51 to the output data 50 (S503). The control section 13 transmits the output data 50, to which the ID information 51 is added, to the image output apparatus 1 (S504). The image output apparatus 1 holds the received output data in the storage section 3 (S505).

After transmitting the output data 50 to the image output apparatus 1, the control section 13 checks whether or not the image data, from which the output data 50 are created, are updated (S506). When the currently processed page is updated, the control section 13 instructs the output data creation section 14 to create the output data 50 of the updated image data (S507). The output data creation section 14 creates the ID information 51 of the image data, from which the output data 50 are created, and adds the ID information 51 to the output data 50 (S508). The control section 13 transmits the output data 50, to which the ID information 51 is added, to the image output apparatus 1 (S509).

When the output data 50 are inputted from the information processing apparatus 7, the control section 2 of the image output apparatus 1 extracts the ID information 51 added to the output data 50, and identifies the ID information 51 (S510). The control section 2 checks whether or not the output data 50, to which the same ID information 51 as the identified ID information 51 is added, are held in the storage section 3 (S511).

When the output data 50, to which the same ID information 51 is added, are held, the control section 2 overwrites the inputted output data 50 on the previously stored output data (S512). When the output data 50, to which the same ID information 51 is added, are not stored, the control section 2 newly holds the inputted output data 50 in the storage section 3 (S513).

The control section 13 checks whether or not the output instruction of the processed image data is inputted (S514). When the output instruction is not inputted, the control section 13 again checks whether or not the image data are updated (S506). When the image data are updated, the control section 13 makes the output data 50 of the updated image data created, and transmits the created output data 50 to the image output apparatus 1 (S515).

When, after the processing of the image data is completed, the image data are outputted, the processing is performed similarly to the first embodiment, as shown in FIG. 3. Further, also when the processing of the image data is completed without the output instruction being inputted by the user, the processing is performed similarly to the first embodiment.

In the above described configuration, the control section 13 does not make the output data generated and transmitted at the same time when the image data file is opened, but makes the output data created and transmitted after detecting the input from the user.

Thereby, even when image data are inputted from a plurality of image processing apparatuses, the output control system is able to identify from which one of the information processing apparatuses the image data are inputted. Further, even when the image data are outputted from the same information processing apparatus, it is possible to determine whether or not the image data can be overwritten. That is, even when any of the image data are updated, the held output data 50 can be surely updated. Further, even when the output instruction of any of the image data is inputted, the held output data 50 can be surely outputted.

Third Embodiment

Figure 8:
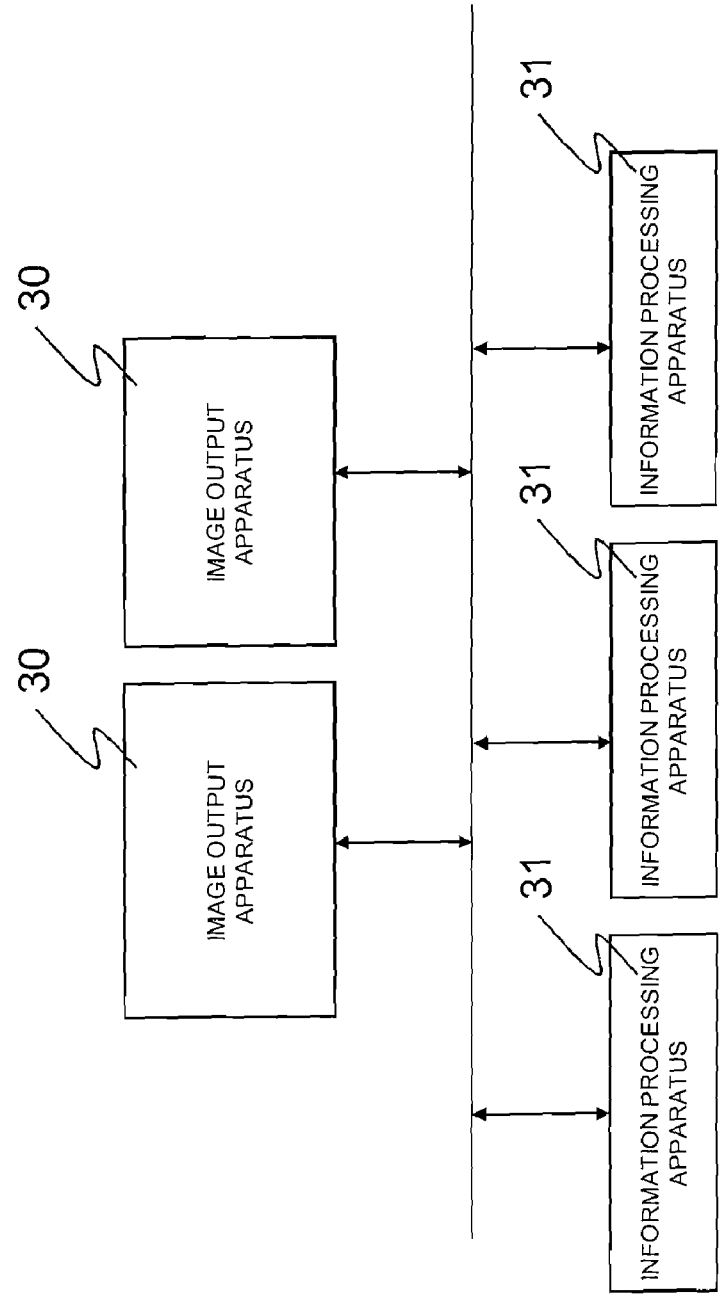
FIG. 8 is a block diagram showing an example of an output control system according to a third embodiment.

Next, an output control system according to a third embodiment will be described with reference to FIG. 8 to FIG. 10. Note that in the present embodiment, the output control system is configured, as shown in FIG. 8, by a plurality of image output apparatuses 30 and a plurality of information processing apparatuses 31. The other configuration and operation effects are the same as those of the first embodiment and the second embodiment.

Figure 9:
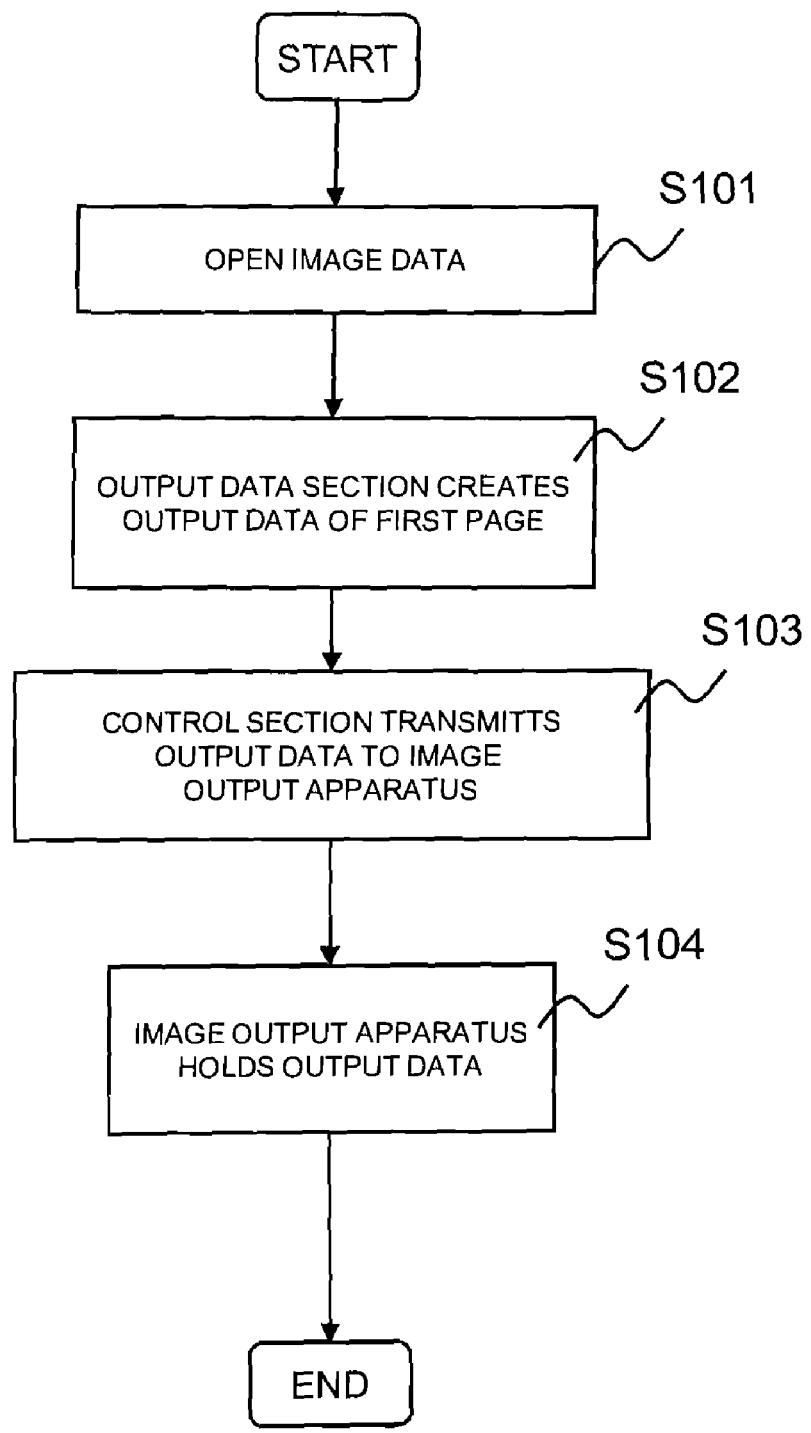
FIG. 9 is a flow chart showing an operation in the case where the information processing apparatus outputs output data to one image output apparatus.

In the case of one image output apparatus 1, the control section 13 outputs, as shown in FIG. 9, the output data to the one image output apparatus 1. However, in the present embodiment, there are the plurality of image output apparatuses 30, and hence it is not determined which one of the image output apparatuses 30 is instructed by the user to output the image data.

Thus, as shown in FIG. 10, the output data are transmitted to the plurality of image output apparatuses 30. Each of the image output apparatus 30 holds the received output data in the storage section 3. Thereby, the output control system is able to immediately start the processing, even when the user selects any one of the image output apparatuses.

Note that when the output instruction is inputted by the user, the control section 13 instructs the image output apparatus other than image output apparatus 1 specified as the output destination, to delete the held output data. Thereby, the previously transmitted output data are surely deleted, and hence it is possible to surely prevent leakage of information.

Note that the present invention is not limited to the above described embodiments, but numerous modifications and changes can be obviously made therein without departing from the scope of the present invention. The present embodiments are described in the case of the print mode, but may also be used in the case of a FAX mode. In the case of the FAX mode, the image output apparatus converts the image data into the output data. The FAX is unable to output until a telephone connection is effected. However, according to the above described configuration, the image data transmitted in advance can be converted into the output data, and hence the processing time necessary for the data conversion can be reduced.

At the same time when the image data file is opened, the control section instructs the output data creation section to generate the output data related to the image data of the opened file. However, when an image data file is newly opened, the control section may instruct the output data creation section to generate the output data after waiting for the input from the user. Thereby, the processing capability of the control section, for generating output data related to image data into which no data are inputted, can be used for other processing operation.

The information processing apparatus is not limited to terminal apparatuses, such as a personal computer, and may also be an image processing apparatus. The information processing apparatus may also be a touch panel in which a display section is integrated with an input section.

The output data creation section is provided in the control section of the information processing apparatus, but may also be provided in the control section of the image output apparatus. Alternatively, the output data creation section may also be provided as a dedicated apparatus, like a server, for generating the output data from the image data. In this case, the information processing apparatus outputs the image data to the apparatus dedicated for generating output data, and then the dedicated apparatus outputs the output data to the image output apparatus.

What is claimed is:

1. An output control system comprising:
   an information processing apparatus which processes image data; and an image output apparatus which outputs the processed image data,
   wherein at the same time when the image data file is opened, the information processing apparatus generates, from a part of the image data, output data which can be outputted by the information processing apparatus, and transmits the generated image data to the image output apparatus, and
   wherein the image output apparatus holds the inputted image data to be outputted in an outputtable state,
   wherein when the information processing apparatus instructs the image output apparatus to output the image data, the image output apparatus outputs the image data held therein, and
   wherein while the image output apparatus outputs the image data, the information processing apparatus transmits remaining image data to the image output apparatus.

2. The output control system according to claim 1, wherein the information processing apparatus transmits the image data to the image output apparatus each time the image data are updated.

3. The output control system according to claim 2, wherein when the information processing apparatus completes the processing of the image data, the image output apparatus deletes the image data held therein.

4. The output control system according to claim 1, wherein the information processing apparatus adds ID information for identifying the image data to the image data to be transmitted.

5. The output control system according to claim 4, wherein the ID information includes one or more of user information, information processing apparatus information, image data information, a date and time, and a page number.

6. The output control system according to claim 1, wherein the image data have a plurality of pages, and
   wherein the information processing apparatus transmits the first page of the image data.

7. The output control system according to claim 1,
   wherein the image data have a plurality of pages, and
   wherein the information processing apparatus transmits a currently processed page of the image data.

8. The output control system according to claim 1, comprising
   a plurality of the image output apparatuses, and
   wherein the information processing apparatus transmits the same image data to one or more of the image output apparatuses.

* * * * *